United States Patent [19]

Mosely et al.

[11] 4,435,113

[45] Mar. 6, 1984

[54] SELF-PROPELLED FREIGHT HANDLING TRUCK

[75] Inventors: John F. Mosely, Ormond Beach, Fla.; Stephen R. Austin, Winnetka, Ill.

[73] Assignee: Superior Handling Equipment, Inc., Ormond Beach, Fla.

[21] Appl. No.: 295,783

[22] Filed: Aug. 24, 1981

[51] Int. Cl.³ .............................................. B66F 9/08
[52] U.S. Cl. .................................... 414/347; 180/209; 187/9 R; 280/638; 414/537; 414/622; 414/629
[58] Field of Search ............... 414/467, 498, 622, 537, 414/629, 634, 635, 346, 639–642, 785, 347; 187/9 R; 180/209, 638

[56] References Cited

U.S. PATENT DOCUMENTS

| 3,190,994 | 6/1965 | Becker et al. ............... 180/19.3 X |
| 3,302,810 | 2/1967 | Heidrick ............................ 414/629 |
| 3,388,820 | 6/1968 | Lebre ................................. 187/9 R |
| 3,561,621 | 2/1971 | Rivers .............................. 414/537 |
| 3,567,054 | 3/1971 | Emke ................................ 414/785 |
| 3,616,953 | 11/1971 | Shaffer ......................... 280/638 X |
| 4,061,237 | 12/1977 | Austin et al. ..................... 414/467 |
| 4,239,447 | 12/1980 | Bach ............................. 414/537 X |
| 4,354,795 | 10/1982 | Dutra .............................. 414/622 |

Primary Examiner—Robert G. Sheridan
Attorney, Agent, or Firm—Arthur G. Yeager

[57] ABSTRACT

The self-propelled freight handling truck is comprised of a manually guided wheeled frame on which is mounted a mast and lifting forks, with a motor for supplying power to raise, lower, and tilt the forks, to propel the vehicle, to move front wheels laterally outboard to straddle a load or laterally inboard under the load while the load is being carried, and to extend or retract the front wheels telescopically the guide handle and said forks being foldable into a collapsed, compact storage position. A beverage handling system is also provided comprising a side-loading highway truck for transporting a driver, unitized loads of beverages and freight, and the self-propelled fork lift truck mentioned above. The truck and system of this invention is particularly useful in the handling of full or partially unitized beverage loads between the side-loading highway truck and the delivery facility.

18 Claims, 6 Drawing Figures

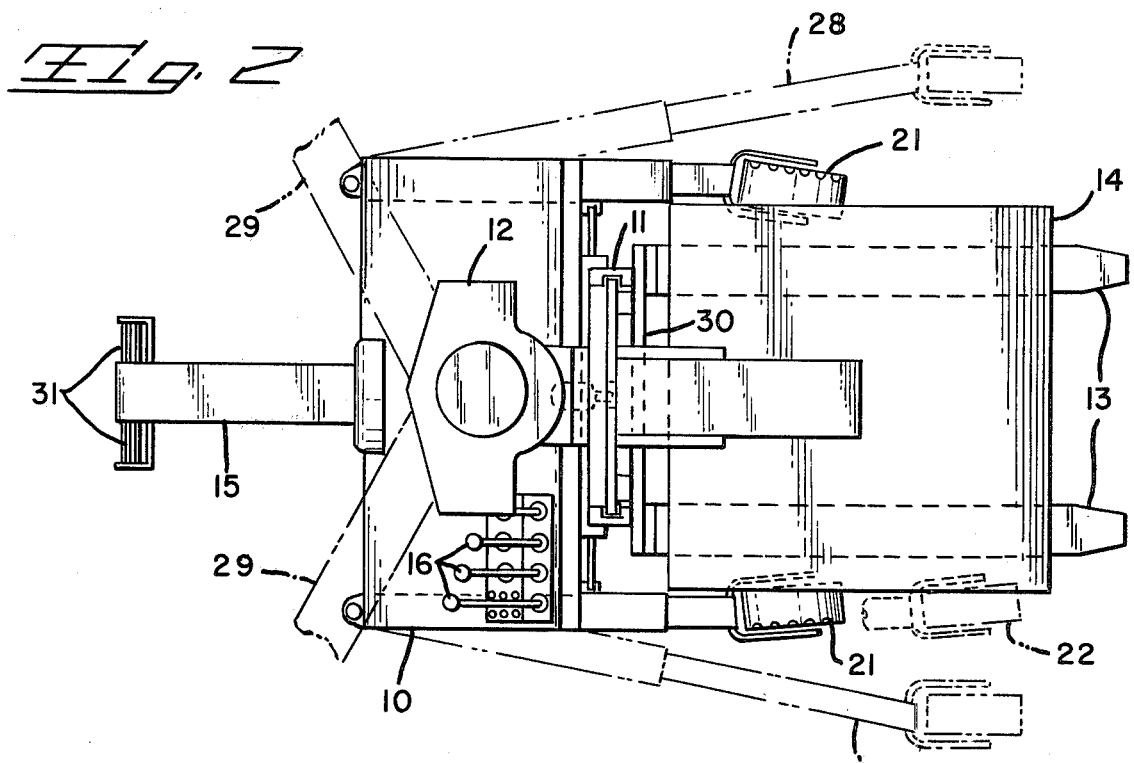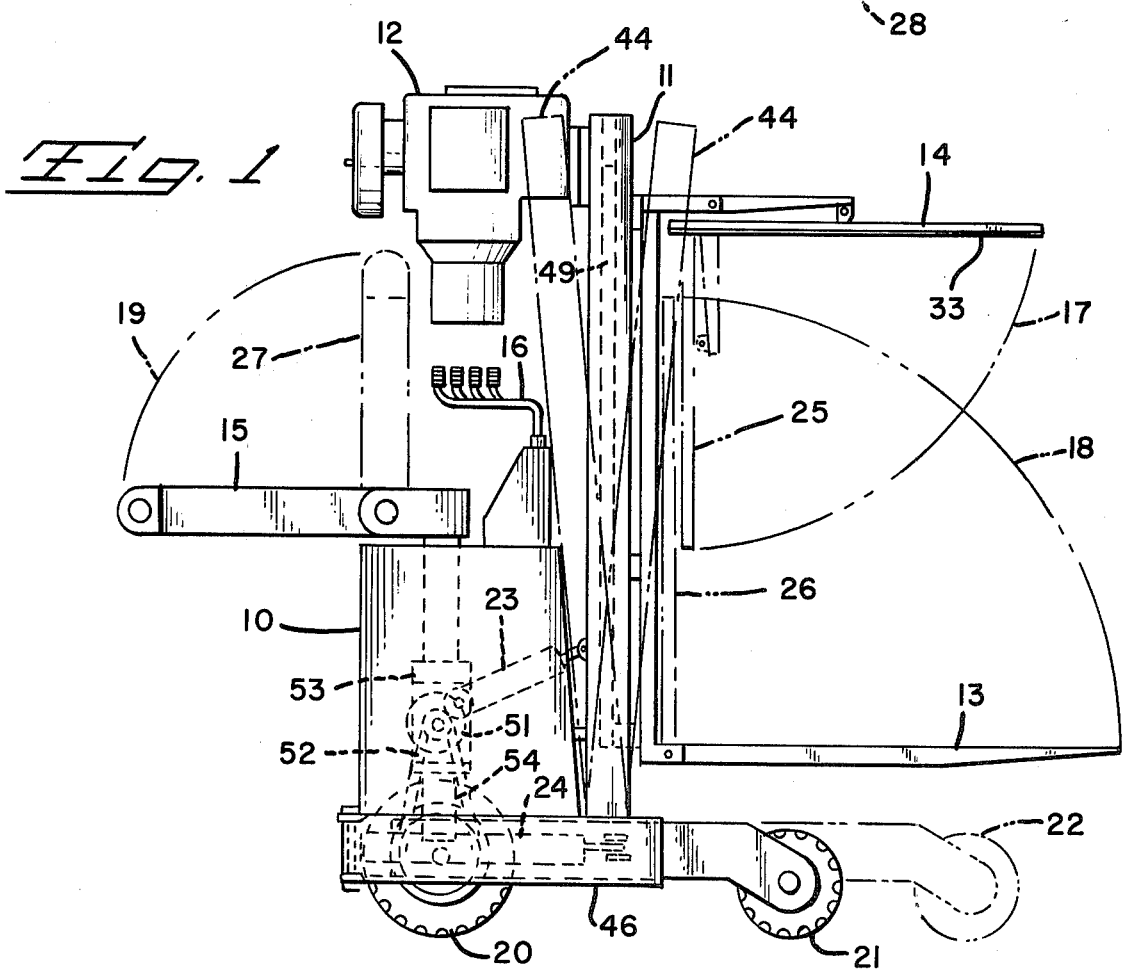

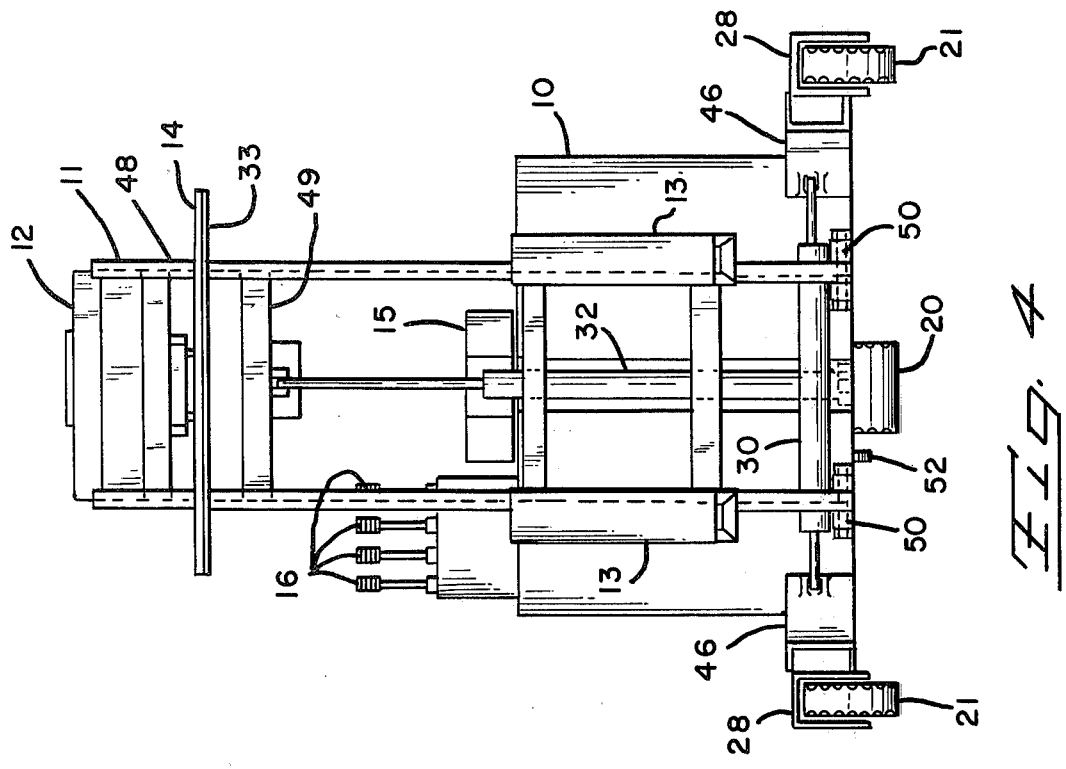
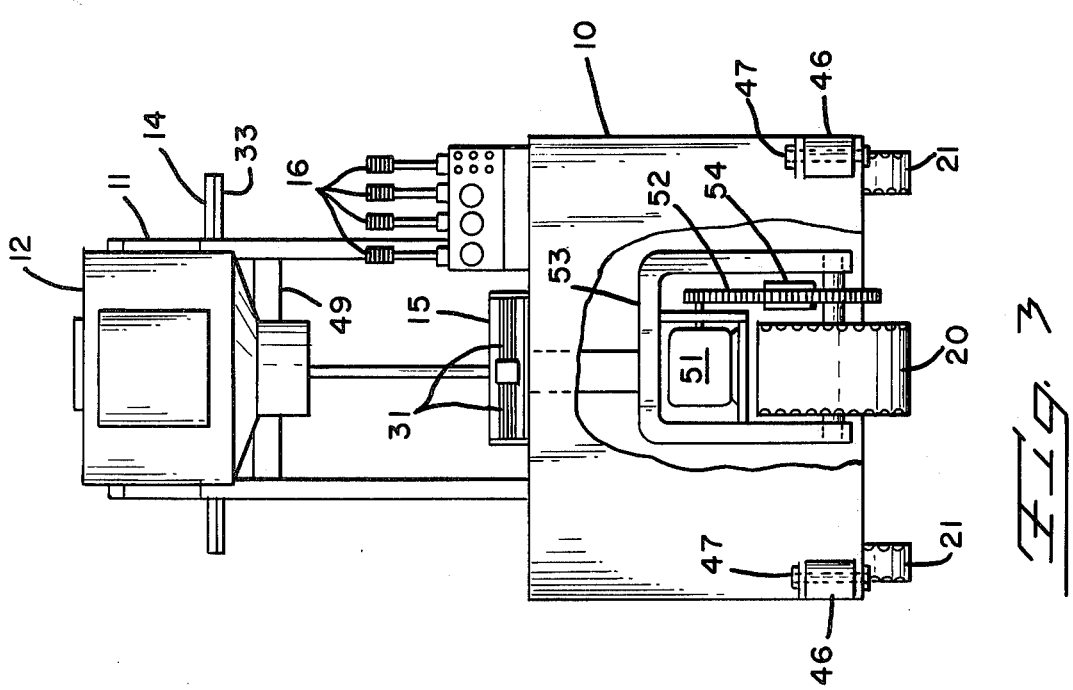

SELF-PROPELLED FREIGHT HANDLING TRUCK

BACKGROUND OF THE INVENTION

Forklift trucks are well-known devices for moving and stacking large quantities of light or heavy materials. Forklift trucks may be of the counterbalanced or straddle-leg design and usually are large enough to carry a driver and move about in all types of warehouse and manufacturing areas. For a few specialized purposes, forklift trucks have been miniaturized and carried on a highway transport truck by hanging from the rear of the truck or carried inside the cargo space of a rear-loading truck. In U.S. Pat. No. 3,799,379 and U.S. Pat. No. 4,180,363, there are shown forklift trucks that can attach their lifting forks to stirrups on the bed of a transport truck, lift themselves off the ground up to the truck bed, and be secured in that position for highway transport to any location. In U.S. Pat. No. 4,061,237, there is shown a collapsible forklift truck that can lift itself into a transport truck and be stored in a folded state inside the truck. While these forklift trucks are usable for many purposes, they are not appropriate for tasks such as unloading entire or partial pallet loads from a side-loading beverage truck and moving those unit loads of beverages on pallets through narrow doors, hallways, and crowded aisles to the inside of congested stores. Previously, this task was accomplished with much manual labor and usually no powered self-propelled equipment. Forklift trucks have not been made of such a size, weight, and configuration that they can carry a full pallet load readily through an ordinary door slightly larger than a pallet load in width, while being able to set the pallet down on the floor between the straddled front wheels, and yet, when stored out of use, be made sufficiently compact to be carried within the area of a single pallet in one bay of a side-loading highway truck. Delivery of cases of beverage from a truck parked outside a delivery building to inside storage areas or directly to sales areas involves special problems that could be greatly alleviated by the assistance of any self-propelled equipment with the before-mentioned characteristics.

It is an object of this invention to provide a small, collapsible forklift truck that is self-propelled, can be carried in a small section of an ordinary freight handling highway truck, and in a few moments can be made available to unload and transport freight from the truck into a building, or transport freight from the building and load it into the highway truck. It is another object of the invention to provide a forklift truck which is self-propelled and which can, while moving with or without a transported load, spread its front wheels apart in preparation for setting a load on the floor or close the front wheels inward under the load area when it is necessary to pass through a narrow opening, such as a door, hallway, or aisle which is only slightly wider than the width of the unitized load being transported. Still other objects will appear from a more detailed description of this invention which follows.

BRIEF SUMMARY OF THE INVENTION

This invention provides a collapsible, self-propelled freight handling truck comprising a frame mounted on at least three wheels and supporting a mast, lifting forks, a motor to supply power, a tiller for guiding said wheels, and controls for selectively directing said power to the functional components of said truck; said wheels including at least one driving wheel powered by said motor, and at least two driven wheels mounted respectively on two horizontally pivotable arms; said tiller providing means for manually guiding said truck and including manually operated controls to propel said truck forward or reverse, to stop the movement of said truck, to raise, lower, or tilt said lifting forks, to spread or close said pivotable wheel arms, and to extend or retract said two driven wheels; said tiller and said lifting forks being separately foldable to collapse against said frame for storage of said truck. In one specific embodiment of this invention, a foldable horizontal surface is mounted above said lifting forks to provide a clamping means against which said fork can clamp and stabilize material carried on the forks.

This invention also provides a beverage transport system comprising a highway traveling truck for transporting interiorly thereof, a driver, a plurality of cases of beverage, and a self-propelled beverage handling forklift truck for transporting cases of beverage from said highway traveling truck into a building and returning with cases of empties, said highway traveling truck including an interior bay portion wherein said self-propelled forklift truck fits in a collapsed condition, said bay portion containing a pivotable ramp which in its open position extends from the floor of said bay portion to the ground, said self-propelled forklift truck including foldable lifting forks mounted on a wheeled frame supporting a foldable tiller arm for guiding said forklift truck and a power means for propelling said forklift truck and for raising, lowering, and tilting said lifting forks.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a side elevation view of the forklift truck of this invention.

FIG. 2 is a top plan view of the forklift truck of this invention.

FIG. 3 is a rear elevation view of the forklift truck of this invention.

FIG. 4 is a front elevation view of the forklift truck of this invention.

DETAILED DESCRIPTION OF THE INVENTION

Figure 5:
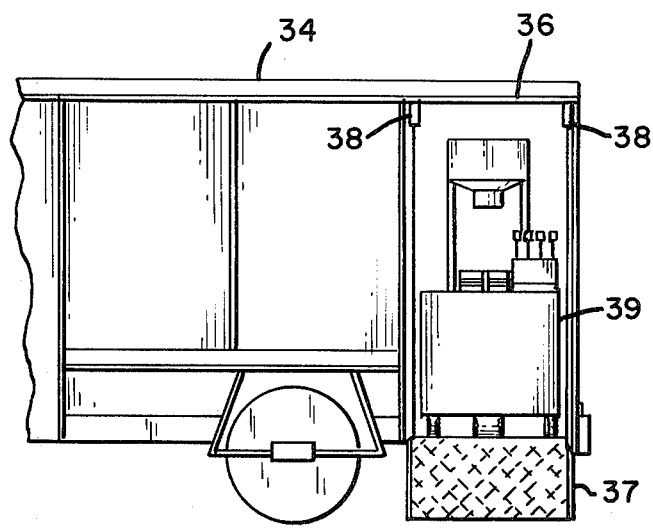
FIG. 5 is a partial view of the beverage handling system of this invention involving a beverage handling truck and the forklift truck of the invention mounted therein.

In FIGS. 1-4 there are shown the details of the self-propelled freight handling truck of this invention. The truck includes a body 10 to which is attached a mast 11 and wheels 20 and 21. Lifting forks 13 are mounted on mast 11 such that they may be raised or lowered in the manner well-known of forklift trucks in general. Motor 12 is attached to mast 11 and is of the appropriate size, power, and connections to propel the truck and to operate all of the power driven parts thereof. Motor 12 preferably is an internal combustion engine, such a 2-cylinder Briggs & Stratton vertical shaft engine of 16-18 H.P. Such an engine can be operated on any normal hydrocarbon fuel such as gasoline, propane, or alcohol-modified hydrocarbon fuels.

The truck of this invention is guided and its speed is regulated through power handle 15 which is a tiller control means. The truck of this invention is intended to be driven by a person who walks along with the truck guiding and controlling it through power handle 15. In the embodiment shown in this invention, power handle 15 is connected directly to a single driving wheel 20 which is guided by moving handle 15 in any horizontal direction between the positions shown at 29. Handle grips 31 are rotatable manually and are connected electrically to the hydraulic drive unit similar in operation to the handle grips of electric power pallet jacks.

The rotation of handle grips 31 in one direction gradually increases hydraulic pressure to driving wheel 20 producing driving movement in one direction, and when the handle grip is twisted in the reverse direction driving movement of wheel 20 is produced in the opposite direction. There is also a control incorporated into handle grips 31 to function as a brake so that the movement of wheel 20 in driving the truck of this invention may be slowed or brought to a stop in accordance with the desires of the driver by twisting handle grip 31 to the neutral position. The driving system of this truck incorporates a "dead man" brake such that when there is no pressure whatsoever on handle grip 31 to drive the unit forward or reverse, the handle grip will automatically return to the neutral position and the brake will be fully applied to prevent any movement of the truck. As the twist grip is rotated to move the truck in the forward or reverse directions the brake is correspondingly released as increased power is applied to the drive wheel and the truck is able to be propelled by the power directed to wheel 20.

The truck is also provided with two movable straddle wheels 21 attached to legs 46 which can be telescopically extended forward to move the wheels to the position shown at 22, and legs 46 can also be expanded to a wider straddle position as shown at 28. These positions of legs 46 permit the truck to be collapsed to a small volume for storage, or they permit the truck to be expanded into a position for lowering and lifting materials of various sorts to and from the floor between legs in position 28. Wheels 21 are idler wheels which have no connection to the power developed by motor 12 as compared to driving wheel 20 which is directly connected to such power by any suitable power transmission means. Legs 46 are attached to body 10 by pivot pins 47.

Mast 11 includes two vertical guide rails 48 and a carriage 49 which moves vertically on rails 48 and to which are attached forks 13 and top clamp 14. Guide rails 48 are pivoted at 50 by pins attached to body 10. Top clamp 14 provides an opposing surface against which a load on forks 13 can be clamped. Such a feature obviously provides a security against dropping material carried on forks 13 while being transported from one place to another. Preferably, top clamp 14 has a layer 33 of resilient material which will provide a more positive and secure clamping and stabilizing surface against which most freight, including bottles or cans of beverage, can be clamped and stabilized. Top clamp 14 is attached to carriage 49 by a screw device or a hydraulic cylinder to provide vertical adjustment relative to forks 13. The attachment is not shown here in order to simplify the drawings because such attachments for top clamps are well known today.

The movement of the various components of the truck of this invention is preferably controlled by a plurality of hydraulic pistons and cylinders and a series of control levers 16 for those pistons and cylinders. Cylinder 23 is provided to tilt mast 11 forward and backward about pivots 50 between the positions generally shown at 44. Double cylinder 30 performs the functions of widening or narrowing the amount of wheel straddle, i.e., between positions 21 and 28. A pair of cylinders 24 are provided to extend or retract legs 46 and wheels 21, i.e., between positions 22 and 21. Cylinder 32 is employed to raise and lower carriage 49 to any desired position, generally giving forks 13 a travel of at least about 40 inches. The controls for these cylinders are shown schematically at 16 as levers for activating various cylinders along with the necessary instrumentation to check the operability of the system, with buttons and switches to operate and safeguard the various components. Drive wheel 20 may be driven by any suitable power means transmitted from motor 12. A preferred arrangement is a hydraulic motor 51 driving a sprocket and chain drive 52 attached to wheel 20 and mounted in a yoke 53 that, in turn, is connected to tiller power handle 15. A disc brake 54 operates against the sprocket on wheel 20 to provide braking power. Hydraulic connections are not shown in order to simplify the drawings. The hydraulic system includes a reservoir of hydraulic fluid, preferably oil, located in body 10 and in available hollow spaces in the frame and mast, with the necessary hoses, lines, valves, and pump to provide the pressure at whatever location is needed as desired by the driver. These associated items of equipment are not shown in these drawings since they are conventional in hydraulic fluid apparatus. Body 10 is built onto a rigid frame of suitable size and design to support the entire mechanism.

In order to reduce the physical size of the truck for minimum volume storage purposes, its various components are designed to be foldable. Handle 15 is foldable along path 19 to position 27 when it is not needed for control purposes. Forks 13 may be folded along path 18 to position 26 when they are not needed. Top clamp 14 and its supporting structure may be folded along path 17 to the position shown at 25 when it is not needed, e.g., when not used or when the truck is to be stored. It has already been mentioned that wheels 21 may be closed inward toward each other and also retracted to position 21.

Figure 6:
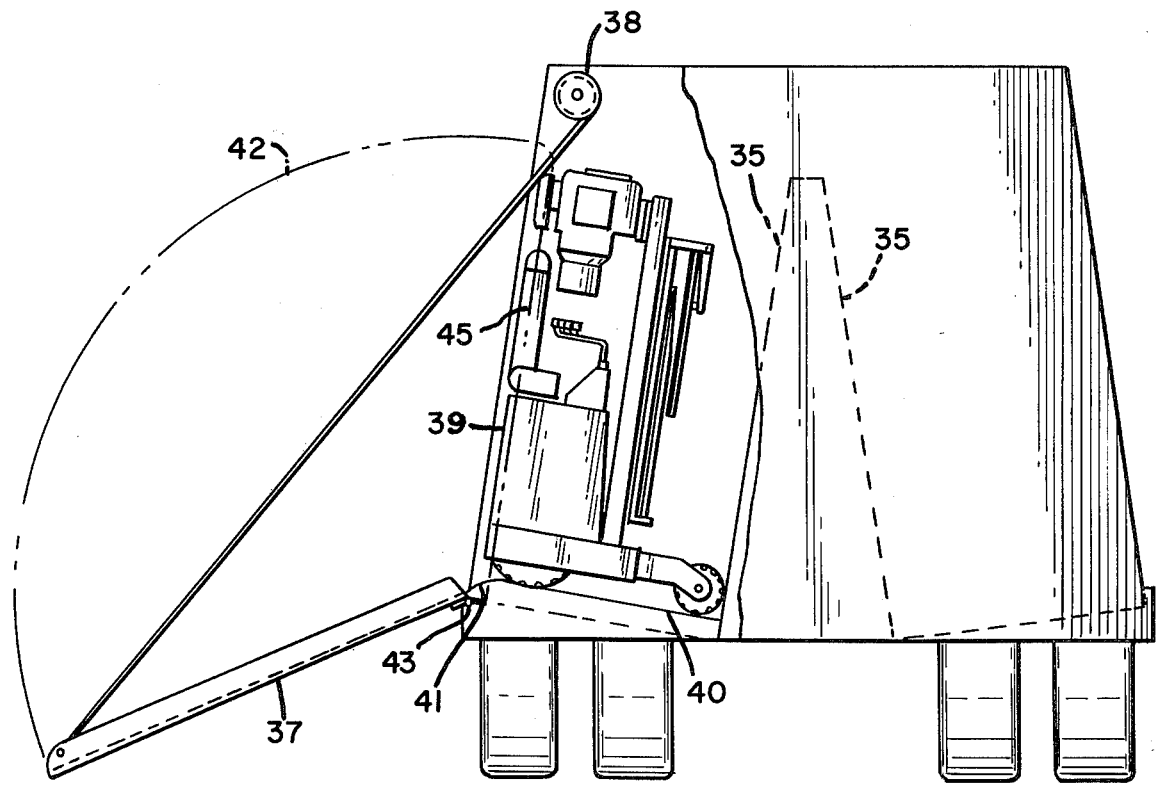
FIG. 6 is a rear view of the beverage handling truck with the forklift truck mounted therein.

In FIGS. 5 and 6, there may be seen the manner in which the truck of this invention is stored and carried on a side-loading beverage delivery truck. Truck 34 has a standard bay or compartment 36 which is modified to carry the self-propelled truck 39 in its folded collapsed condition. In the normal beverage truck, the bays are tilted inwardly as shown at 35 so that the beverage containers will angle toward the center of the truck and will not shift during transport or fall out of the truck when the doors to the bays or compartments are opened. The floor of bay 36 is built up slightly as shown at 40 and curved at its outward end 41 to permit the folded truck 39 to roll smoothly to or from floor 40 to ramp 37 without catching any of the undercarriage of truck 39.

Ramp 37 is hinged at 43 to the bottom of bay 36 to provide a storage position for ramp 37 and to serve as a means to retain the collapsed truck 39 inside bay 36 when ramp 37 is folded to position 45 along path 42 by the action of winch 38. When it is desired to remove truck 39 from beverage truck 34 it is only necessary for the driver to drop ramp 37 to the position shown in FIG. 6, start the motor of the collapsed truck 39, pull handle 15 down to its operating position, and allow the truck 39 to roll down ramp 37 under its self-propelled power. Wheels 21 can then be extended to position 22 or 28, forks 13 can be unfolded and raised as desired to unload beverage pallet loads directly from bays of truck 34 and thus save a considerable amount of manual labor and time normally expended in unloading individual cases from truck 34. When truck 39 is loaded, it can then be led or followed by the driver to its destination, normally inside a building. Returning with empties or a partial pallet load, the driver may lead truck 39 or follow it, whichever suits him best in guiding the forklift truck 39 back to the truck 34. As the driver approaches a doorway, hallway, or narrow aisle it may be necessary for him to cause the straddle wheels to be narrowed to position 22 to pass through the available space and then later to expand those straddle wheels to position 28 to permit placing the load on the floor between them. These movements of the straddle wheels may be accomplished while the vehicle is moving by simply activating the appropriate control lever 16 for hydraulic cylinder 30. Such flexibility is greatly to be desired in handling materials, such as unitized cases of beverage, as they are moved from a truck in the street or parking lot into a store.

While the invention has been described and with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A collapsible, self-propelled freight handling truck adapted to be controlled by a walking operator comprising a frame mounted on at least three wheels and supporting a mast with lifting forks, a motor to supply power to all functional components of said truck, a means for guiding said wheels, and controls for selectively directing said power to said functional components;
   said wheels including at least one driving wheel powered by said motor, and two horizontally pivoted legs with a driven wheel on the forward end of each leg;
   said means for guiding including tiller means for manually guiding said truck and means conveniently available to a walking operator for manually operating the forward, braking, and reverse power to said driving wheel;
   said controls including powered means manually operable while said truck is moving or not moving on its wheels for raising and lowering said lifting forks, tilting said mast, spreading and narrowing said pivoted legs, and extending and retracting said two driven wheels from said pivoted legs;
   said means for guiding and said lifting forks being separately foldable to collapse against said frame for storage of said truck.

2. The truck of claim 1 wherein said lifting forks are slidably mounted on a vertical mast pivoted to permit tilting in a forward or backward direction.

3. The truck of claim 2 wherein said motor is an internal combustion engine.

4. The truck of claim 1 wherein said means for guiding is a tiller having rotatable hand grips adapted to control the speed and direction of movement of said driving wheel and to control the braking thereof.

5. The truck of claim 1 wherein said wheels comprise a single powered driving wheel and two driven wheels.

6. The truck of claim 1 wherein said power is derived from pressurized hydraulic fluid.

7. The truck of claim 1 which includes a vertically adjustable substantially horizontal surface generally parallel to the tines of said lifting forks adapted to cooperate with said lifting forks as a load clamping means.

8. The truck of claim 7 wherein said surface is foldable so as to collapse against said frame for storage.

9. A self-propelled, collapsible, forklift truck comprising a frame including a pair of parallel vertical rails, wheels mounted on said frame for transporting said truck, lifting forks mounted on said rails to move upwards and downwards and selectively to be collapsible against said rails, internal combustion power means for generating power to propel said truck and to raise, lower, and tilt said lifting forks, at least one of said wheels being a driving wheel rotated by said power means, two horizontally pivoted legs with a freely rotating wheel at the forward end of each leg telescopically attached to extend or retract longitudinally from each leg, hydraulic power means to pivot said legs and to extend or retract said wheels, and a tiller guiding means attached to said driving wheel for manually guiding said truck, said tiller being selectively collapsible by folding against said frame.

10. The truck of claim 9 wherein said tiller includes a rotatable hand grip operatively connected to said power means to selectively self-propel said truck in a forward or reverse direction and to apply brakes.

11. The truck of claim 9 which includes a movable horizontal surface selectively positionable to a location generally parallel to said lifting forks and adapted to clamp materials between said surface and said forks.

12. The truck of claim 11 in which said surface is foldable against said vertical rails.

13. The truck of claim 9 in which said power means includes pressurized hydraulic fluid in cylinders containing pistons therein.

14. A beverage transport system comprising a highway transport truck for transporting interiorly thereof a driver, a plurality of cases of beverage, and a self-propelled beverage handling forklift truck for transporting said cases from said highway transport truck to a delivery destination, said highway transport truck including an interior bay enclosing said self-propelled forklift truck in a collapsed condition, said bay having a pivotable ramp which in its closed position is folded against the side of said highway transport truck and in its open position extends from the floor of said bay to the ground, said self-propelled forklift truck including foldable lifting forks mounted on a wheeled frame supporting a foldable tiller for guiding said forklift truck, and power means for propelling said forklift truck, for raising, lowering, and tilting said lifting forks, and for expanding and narrowing the spacing between the wheels adjacent said lifting forks.

15. The system of claim 14 wherein said forklift truck propels itself on at least three wheels, one of which is a driving wheel directly connected to said power means, and the other two of which are unpowered driven wheels, said truck including two legs which are pivotable by said power means to spread apart or be closed upon each other and are telescopically extendable or retractable by said power means, one of said driven wheels being mounted at the forward end of each of said legs.

16. The system of claim 14 wherein said power means includes pressurized hydraulic fluid in cylinders containing pistons movable by said fluid.

17. The system of claim 14 wherein said forklift truck is manually guidable by a tiller arm containing a rotatable hand grip adapted to control the power transmission to a driven wheel to selectively provide forward or reverse movement or braking to said truck.

18. The system of claim 14 which includes a selectively employable clamping surface against which said lifting forks can clamp materials supported on said forks.

* * * * *